United States Patent [19]
Farley et al.

[11] Patent Number: 4,816,898
[45] Date of Patent: Mar. 28, 1989

[54] DIGITAL VIDEO IMAGE CONVERTER

[75] Inventors: Shal W. Farley, Arcadia; William McCown, Pasadena, both of Calif.

[73] Assignee: Video Animation Systems, Inc., Burbank, Calif.

[21] Appl. No.: 75,133

[22] Filed: Jul. 20, 1987

[51] Int. Cl.⁴ .......................... H04N 7/01; H04N 11/20
[52] U.S. Cl. ........................................ 358/11; 358/140; 358/160
[58] Field of Search ............................ 358/140, 11, 160

[56] References Cited

U.S. PATENT DOCUMENTS

| | | | |
|---|---|---|---|
| 4,654,696 | 3/1987 | Dayton | 358/11 |
| 4,677,483 | 6/1987 | Dischert | 358/140 |
| 4,694,337 | 9/1987 | Lyons | 358/140 |
| 4,703,353 | 10/1987 | David | 358/140 |

Primary Examiner—Howard W. Britton
Attorney, Agent, or Firm—Lyon & Lyon

[57] ABSTRACT

Each horizontal line of a high-resolution video image signal, input in an image format having a plurality of pixels of a predetermined resolution, is subjected to anti-alias filtering to produce a smooth analog signal with limited bandwidth. The smooth analog signal is sampled by an A/D converter and converted to an image format with different resolution from the original image signal, but without discarding all the information from any input pixel. Each converted horizontal line is matched, pixel by pixel, with successive and preceding horizontal lines, and subjected to a weighted averaging process to produce an output image with different vertical resolution from the original image signal, again without discarding all the information from any input pixel.

36 Claims, 2 Drawing Sheets

DIGITAL VIDEO IMAGE CONVERTER

BACKGROUND OF THE INVENTION

1. Field of the Invention

This invention relates to the fields of video imaging and image processing.

2. Description of Related Art

The field of video imaging has developed along parallel paths, producing one mode of representation for imaging of video signals in a broadcast context (e.g. the broadcast standards NTSC and PAL), and another quite different mode of representation for imaging of video signals in a computer graphics context (e.g. RGB, the separation of a video signal into red, green and blue components). Major differences between these two modes of representation include amount of resolution and timing requirements. The first mode of representation is dominant in the field of broadcast video imaging, such as commercial television and videotape recording, while the second mode of representation is dominant in the field of computer graphics, such as digital image creation, CAD/CAM and computer monitor display. The advancing state of computer graphics has lead to a strong demand for the capability to transfer images rom a computer graphics context to a broadcast video context, retaining the highest possible image resolution and at reasonable cost, while simultaneously flexibly allowing conversion of differences between standards such as aspect ratio and resolution.

One method for converting images from graphics format to broadcast format is to display the graphics video signal on a color computer monitor and to point a video camera at the monitor, taking a broadcast format signal from the output of the video camera. While this method will convert from one format to the other, it is subject to a number of problems, including those of image alignment and synchronization of the camera with the monitor. It is also generally necessary to resynchronize the camera and image for each conversion session, with the result that image details will tend to drift over the duration of a long motion picture.

A second method for converting images from graphics format to broadcast format is to digitally remove information from an input graphics signal and filter the result to produce an output broadcast format signal. Information may typically be removed by removing periodic horizontal scan lines of input, e.g. every other line or every third line. While this method will convert from one format to the other, it is subject to a number of problems. For example, this method is unable to convert aspect ratio, except in certain special cases, and this method tends to distort or lose small area features of the input image, such as fine lines and small size lettering.

Accordingly, it is an object of the invention to provide a method for converting a high-resolution graphics image signal to a broadcast image signal, retaining the highest possible image resolution and at reasonable cost, while simultaneously allowing conversion of differences between modes of representation such as aspect ratio and resolution. This object, as well as other and further objects of the invention, will be apparent after examination of the specification, the drawings, and the claims herein.

SUMMARY OF THE INVENTION

Each horizontal line of a high-resolution video image signal, input from a graphics computer or other similar source in a format having a plurality of pixels of a predetermined resolution, is subjected to anti-alias filtering to produce a smooth analog signal with limited bandwidth. The smooth analog signal is sampled by an A/D converter and converted to a format having a different resolution from the original signal, but without discarding all the information from any input pixel (i.e. using at least some information from each input pixel). Each converted horizontal line is matched, pixel by pixel, with successive and preceding converted horizontal lines, and subjected to a weighted averaging process to produce an output signal having a different vertical resolution from the original signal, again using at least some information from each input pixel.

Without limiting the generality of the invention, output image signals may differ in aspect ratio from input image signals. As the input image signal is "holisticly" transformed into the output image signal, an input image with one aspect ratio may be transformed into an output image with a differing aspect ratio. There is no requirement that transformations of aspect ratio must be in small integer ratios.

Without limiting the generality of the invention, a further advantage is provided by conversion of input data, in a graphic image format such as RGB, into broadcast image format such as NTSC when the image signal is first input. The NTSC image format is more compact than RGB (although it has less color resolution), so conversion of a broadcast image format from one resolution to another is less expensive because there is less information to process.

Without limiting the generality of the invention, line buffers are provided to reorder data from a line by line representation of a signal in a broadcast image format into a multiple data stream format more suited to averaging of multiple horizontal scan lines. Data may be reordered to allow averaging over multiple horizontal scan lines, so that averaging of multiple horizontal scan lines may achieve vertical compression.

DESCRIPTION OF THE PREFERRED EMBODIMENT

Figure 1:
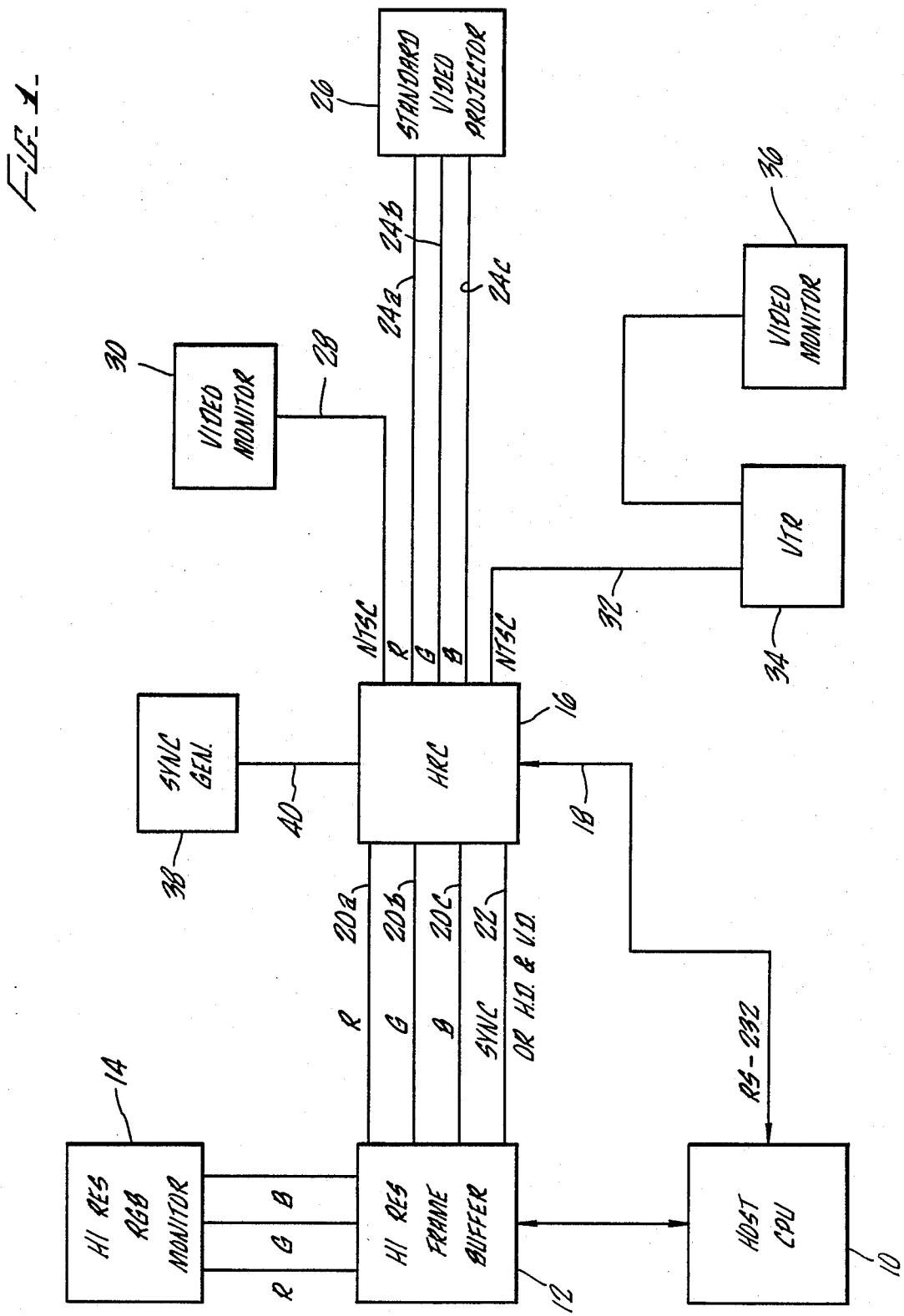
FIG. 1 is a block diagram of preferred application of the present invention.

FIG. 1 is a block diagram of a preferred application of the present invention. A computer system having a central processing unit ("CPU") 10 may store graphics image signals in a high resolution frame buffer 12, as is well known in the art. The frame buffer 12 may be operatively connected to a high resolution monitor 14, for display of image signals which are stored in the frame buffer 12, as is well known in the art. In a preferred embodiment, the computer system supplying graphics image signals may comprise a Daikin graphics system with a format of 1088 lines per frame (1024 of which are visible), and with a repetition rate of 57.468 Hz.

A converter 16 receives control signals from the CPU10 via a serial connection 18 which may comprise an RS-232 connection in a preferred embodiment) and receives image signals from the frame buffer 12 via a set of RGB input ports 20a–c and a SYNC signal line 22. The converter 16 may also receiving timing signals from a SYNC generator 38 via lines 40. The converter 16, after conversion of an image, may transmit converted image signals in RGB format via a set of RGB output ports 24a–c to a video projector 26, or may transmit converted image signals in broadcast format (which may comprise NTSC format in a preferred embodiment) via broadcast signal lines 28 to a video monitor 30, or via broadcast signal lines 32 to a video recorder 34 and thereafter to video monitor 36. Because the converter 16 accepts inputs from the frame buffer 12 just like a high resolution monitor 14, the converter 16 may be operatively connected to the frame buffer 12, and treated by the frame buffer 12, as if it was a high resolution monitor 14. Such connection is well known in the art.

The converter 16 may accept graphics image signals in 1280×1024 pixel, 60 Hz, non-interlace RGB format and may convert those image signals to broadcast video signals (e.g. NTSC signals) or low-resolution RGB signals, using at least some information from each input pixel. The converter 16 may also accept graphics image signals in 1024×1024 pixel or 1024×768 pixel format. It should be clear to one of ordinary skill in the art that other and further input graphics image signal formats may be accepted and converted, and such variations will become clear after an examination of the specification, the drawings, and the claims herein.

In addition to altering resolution of the input image signal, the converter 16 may alter the aspect ratio of the image signal, e.g. making a dimension of the output image signal differ by a programmable amount such as by 2:1 or by 16:7, from the input image signal. The converter 16 is not limited to altering dimensions by small integer ratios.

Figure 2:
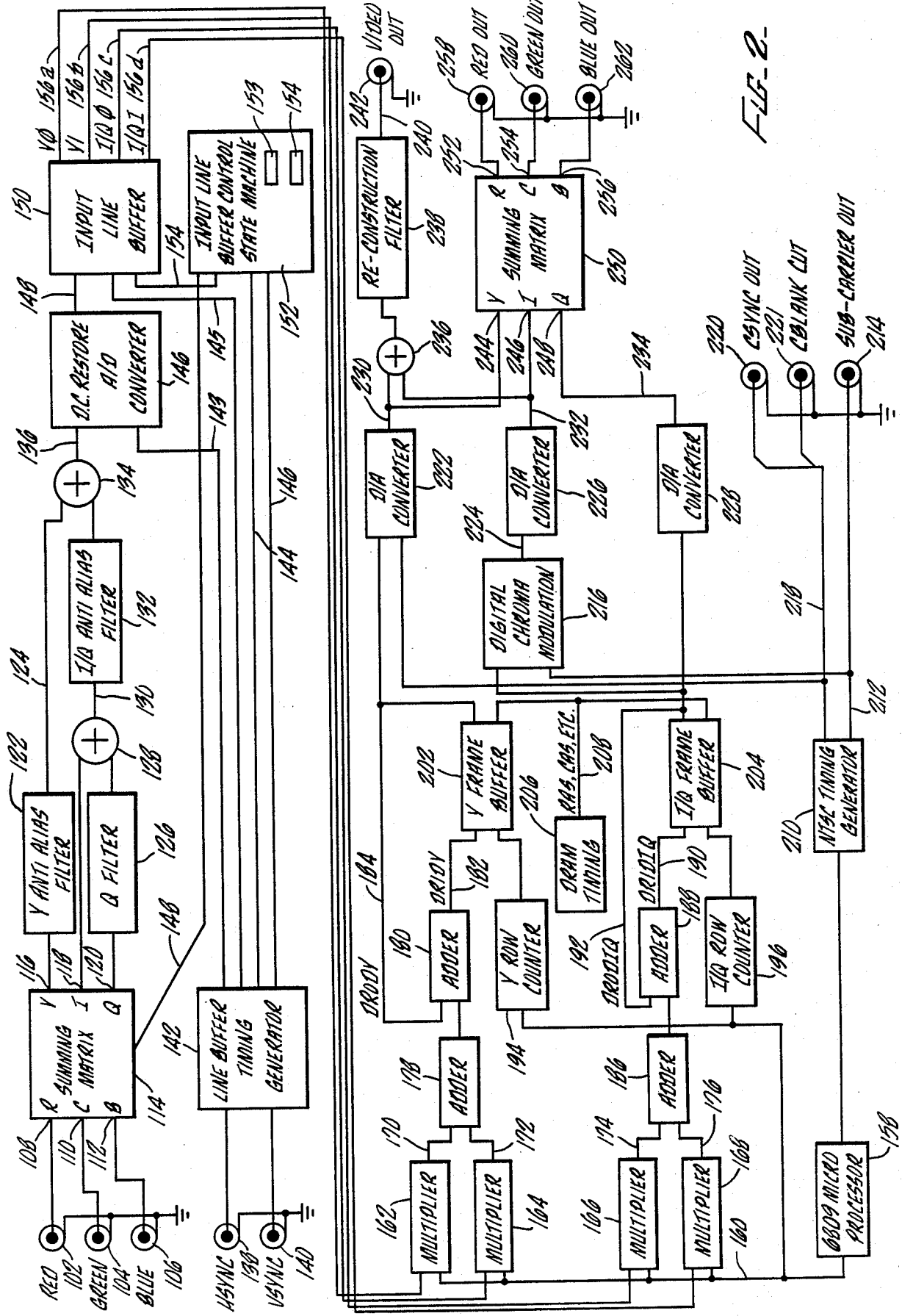
FIG. 2 is a block diagram of an image converter embodying the invention.

FIG. 2 is a block diagram of an image converter embodying the invention. A three-part RGB picture signal, which may comprise a 1280×1024 pixel, 60 Hz, non-interlace RGB signal, is input at nodes 102 (R), 104 (G), and 106 (B) and transmitted to inputs 108 (R), 110 (G), and 112 (B) respectively of a summing matrix 114. The summing matrix 114 generates Y, I, and Q signals at outputs 116 (Y), 118 (I), and 120 (Q) respectively by use of Y, I and Q summing op-amps respectively, as is well known in the art. The Y, I, and Q signals may be calculated as linear weighted sums of the R, G, and B signals, as is well known in the art, according to the linear equations:

$$Y = 0.299\ R + 0.587\ G + 0.114\ B$$

$$I = 0.596\ R - 0.274\ G - 0.322\ B$$

$$Q = 0.211\ R - 0.522\ G + 0.311\ B$$

The Y signal from Y output 116 is transmitted to a Y anti-alias filter 122, which generates a filtered Y signal on line 124. Filtering by an anti-alias filter is desired so that later digitizing of the signal by a D/A will not generate false images of frequency components which exceed the sampling rate, as is well known in the art. In a preferred embodiment, the Y signal is digitized by sampling at a rate of about 60 MHz, thus the Y anti-alias filter 122 filters accordingly, with a cut-off frequency of about 17 MHz and reaching at least 46 db attenuation at 30 MHz, as is well known in the art. In a preferred embodiment, the Y anti-alias filter 122 is a delay equalized filter or a linear phase filter, to minimize time-domain distortion or phase distortion, as is well known in the art.

The Q signal from Q output 120 is transmitted to a Q filter 126, filtered, and summed at node 128 with the I signal from I output 118 to produce a filtered I/Q output on line 130. In a preferred embodiment, the Q signal is filtered to meet NTSC requirements by reducing its bandwith to about 2 MHz.

This filtering characteristic corresponds to the Q filtering characteristic specified by the NTSC standard, increased by a factor of about 4.1, based on the ratio of the input sample rate (60 MHz) to the output sample rate (14.31818 MHz) of the converter 16.

The filtered I/Q output on line 130 is transmitted to a I/Q anti-alias filter 132, filtered, and summed at node 134 with the filtered Y signal from line 124 to produce a combined analog signal on line 136. This filtering characteristic corresponds to the I filtering characteristic specified by the NTSC standard, increased by the same factor as the Q filtering characteristic. Although the Q signal is operated on by both the Q filter 126 and the I/Q filter 132, the resultant Q signal is not significantly different from the NTSC requirements, as increased by the factor of 4.1 noted above.

In a preferred embodiment, the I and Q signals are digitized by sampling at a rate of about 30 MHz, and the I/Q anti-alias filter 132 filters accordingly, with a cutoff frequency of about 6 MHz. The Q filter 126 and I/Q filter 132 are chosen to achieve an I bandwidth of about 1.5 MHz and a Q bandwidth of about 0.5 MHz in the broadcast video output, as specified in the NTSC standard and as is well known in the art.

Summing elements 128 and 134 combine the Y, I, and Q signals for input to an A/D 146. As noted with respect to summing matrix 114, Y, I, and Q signals 116 (Y), 118 (I), and 120 (Q) are computed by use of Y, I, and Q summing op-amps respectively in summing matrix 114. Selection of Y, I, and Q signals is performed by muting each summing op-amp, as is well known in the art, in sequence so that only one Y, I, or Q signal reaches A/D 146 at a time. Control of Y, I and Q op-amp muting is performed in response to control signals on line 148 from buffer controller 152.

Horizontal (HSYNC) and vertical (VSYNC) synchronization signals are input at nodes 138 and 140 respectively and transmitted to a timing generator 142, which generates an A/D clock on line 143 and a controller clock on line 144. A preferred embodiment may also include circuitry to separate HSYNC and VSYNC signals from a composite synchronization signal input or a composite ¢sync-on-green" input, as is well known in the art. In a preferred embodiment, timing generator 142 generates a 60 MHz main clock by phase locking that main clock to 960 times the HSYNC signal with a phased-locked loop, as is well known in the art. The 60 MHz main clock is used to generate an A/D clock on line 143, a controller clock on line 144 and a set of line buffer clocks on bus 145.

The A/D clock on line 143 is 60 MHz, and allows A/D 146 to sample the analog signal on line 136 at a 60 MHz rate. The controller clock on line 144 is generated by dividing the main clock by 4, and allows the buffer controller to operate at 15 MHz. Bus 145 propagates a set of four 15 MHz clocks, each delayed by one main clock cycle time from the others, to line buffer 150. This allows line buffer 150 to demultiplex a set of four samples from A/D 146, as is well known in the art. Timing generator 142 also receives a 14.31818 MHz clock from an NTSC timing generator 210, for directing output from line buffer 150, and propagates that clock to buffer controller 152.

An A/D 146, in sequence with the A/D clock from line 143, samples the analog signal from line 136 to generate a digital composite signal on line 148, as is well known in the art. In a preferred embodiment, A/D 146 may include DC restore circuitry, for removing the DC component of the composite analog signal prior to conversion, as is well known in the art.

A line buffer 150 receives the digital composite signal from line 148 and records Y, I, and Q data samples from that signal for two complete horizontal scan lines. A buffer controller 152, in sequence with the controller clock from line 144, generates address signals on line 154 to indicate where in memory the line buffer 150 should store each data sample. The buffer controller 152 also generates signals on line 154 to indicate when the line buffer 150 should read out Y, I, and Q data samples as the signals Y0, Y1, I/Q0, and I/Q1, on lines 156a–d respectively. Thus, the line buffer 150 effectively converts a 60 MHz, 8-bit set of data values on input to a 14.31818 MHz, 32-bit set of data values on output.

The line buffer 150 is organized as 256 planes of memory, each plane comprising 4×4 locations of 8-bit values ("bytes"). Each byte is an 8-bit sample value which was received from A/D 146 via line 148. As the line buffer 150 records Y, I, and Q values from two horizontal scan lines, each plane records two Y values, one I value, and one Q value. Half of all I/Q values are discarded because I/Q are sampled only half as often as Y.

Each plane records Y, I, and Q values as shown in the following table. Y0, I0, and Q0 are samples from the first of two scan lines, and Y1, I1, and Q1 are samples from the second of two horizontal scan lines. Yx.0-3 are the 0th, 1st, 2nd, and 3rd bytes of the Y0 scan line. The next byte plane repeats this pattern with the Yx.4-7, Ix.4-7, and Qx.4-7 values. Each set of values is read in horizontally, starting at successive offsets, starting at the first (underlined) diagonal:

| Y0.0 | Y0.1 | Y0.2 | Y0.3 |
|------|------|------|------|
| Y1.3 | Y1.0 | Y1.1 | Y1.2 |
| I0.2 | Q0.3 | I0.0 | Q0.1 |
| Q1.1 | I1.2 | Q1.3 | I1.0 |

Each set of values is read out in a diagonal, starting at successive offsets, as shown in the following table. Each set of values is then unscrambled by a shifter array which rotates the output word by 0, 1, 2, or 3 bytes successively to produce separate Y0, Y1, I/Q0, and I/Q1 values on lines 156a–d. The line buffer 150 is organized this way so that Y, I, and Q values may be quickly read into the line buffer 150 from A/D 146, and may be equally quickly read out from the line buffer 150 as the signals Y0 (comprising successive Y0.x values), Y1 (comprising successive Y1.x values), I/Q0 (comprising alternating I0.x and Q0.x values), and I/Q1 (comprising alternating I1.x and Q1.x values) on lines 156a–d respectively.

| Y0.0 | Y1.0 | I0.0 | I1.0 |
|------|------|------|------|
| Q1.1 | Y0.1 | Y1.1 | Q0.1 |
| I0.2 | I1.2 | Y0.2 | Y1.2 |
| Y1.3 | Q0.3 | Q1.3 | Y0.3 |

In a preferred embodiment, the buffer controller 152 may be implemented as a ROM based state machine which is sequenced by the controller clock signal on line 144. The state machine cycles through states indicating that Y0, Y1, I0, I1, Q0, and Q1 values are being sampled and then waits for another set of samples. At each state the buffer controller 152 directs summing matrix 114, via control lines 1488, to unmute the Y, I, or Q summing op-amp for a respective data value, i.e. a Y0, Y1, I0, I1, Q0, or Q1 data value, and directs A/D 146 to store those sample values in successive memory locations (discarding alternate I and Q values, as noted above).

The buffer controller 152 divides the controller clock from line 144 by 240 (thus dividing the main clock by 960) to provide a reference horizontal synchronization signal on line 146 for timing generator 142, as is well known in the art. A counter register 153 generated in this clock division is decoded to produce control signals on line 154 for line buffer 150. These control signals simply direct which memory circuits in line buffer 150 store data at any given time, and a workable decoding scheme would be clear to one of ordinary skill in the art after perusal of the memory organization of line buffer 150.

The buffer controller 152 cycles through either states: "WAIT", "Y0", "Y1", "I0", "I1", "Q0", "Q1", and "FIN", one state per reset of the counter register 153 to zero. The "WAIT" state causes the buffer controller 152 to wait for a signal from microprocessor 158 indicating that the desired horizontal scan line has been reached and is available for sampling. The "Y0", "Y1", "I0", "I1", "Q0", and "Q1" states direct the line buffer 150 to record Y0, Y1, I0, I1, Q0 and Q1 data respectively. The "FIN" state does no operation, and is present to provide a short time delay.

Successive memory locations are successive bytes within a row, successive rows within a plane, and successive planes in the line buffer 150. To count successive locations, the buffer controller 152 may comprise a 12 bit counter which counts the number of samples for each horizontal scan line, and may be incremented by each horizontal pixel pulse and cleared by each vertical pixel pulse.

When the buffer controller 152 is in the "WAIT" state, a microprocessor 158 may direct it to read data out of line buffer 150 in conjunction with the 14.31818 MHz clock from timing generator 142. Readout proceeds by use of a counter register 154, which counts through data stored in the line buffer 150 in the order disclosed above.

Each of the signals Y0, Y1, I/Q0, and I/Q1, on lines 156a–d respectively, is transmitted to multipliers 162, 164, 166, and 168 respectively, which multiply their sample values by weight factors received from microprocessor 158 via lines 160 to generate outputs 170, 172, 174, and 176 respectively. Although I and Q are multiplexed as I/Q signals, they each have their own weight factors. Pairs of outputs 170 and 172 are summed by adder 178 and then summed by adder 180 with a feedback Y value on line 184 to produce an averaged Y value on line 182. The averaged Y value on line 182 is transmitted to a Y frame buffer 202, which records that value in a location specified by microprocessor 158 and recorded in Y row counter 194, and provides the feedback Y value on line 184. The feedback Y value is the value of Y from the previous entry in the Y frame buffer 202 for the horizontal scan line being averaged.

Similarly, pairs of outputs 174 and 176 are summed by adder 186 and then summed by adder 188 with a feedback I/Q value on line 192 to produce an averaged I/Q value on line 190. The averaged I/Q value on line 190 is transmitted to an I/Q frame buffer 204, which records that value in a location specified by microprocessor 158 and recorded in I/Q row counter 196, and provides the feedback I/Q value on line 192. The feedback I/Q value is the value of I or Q from the previous entry in the I/Q frame buffer 204 for the horizontal scan line being averaged. Y frame buffer 202 and I/Q frame buffer 204 operate under control of timing signals transmitted by timing generator 206 via lines 208, as is well known in the art.

Computation of the averaged Y value for line 182 and the averaged I/Q value for line 190 allows averaging of Y, I, and Q for multiple horizontal lines of image pixels. In a preferred embodiment, conversion of about 1024 input lines to about 465 output lines leads to averaging of about 2½ input lines per output line. However, it will be clear to one of ordinary skill in the art that almost any number of input lines may be averaged to produce a single output line, and that each input line may be used to compute an average for more than one output line. Other and further variations would also work in the present invention, and such other and further variations would become clear to one of ordinary skill in the art after examination of the specification, the drawings, and the claims herein.

An NTSC timing generator 210 generates a color carrier signal on line 212, which is transmitted to output node 214 and to digital chroma modulator 216, a CSYNC signal on CSYNC/CBLANK bus 218, which is transmitted to output node 220 and to Y D/A 222, and a CBLANK signal on CSYNC/CBLANK bus 218, which is transmitted to output node 221 and to Y D/A 222. The digital chroma modulator 216 may generate a digital chroma signal on line 224, which is transmitted to I D/A 226.

The digital chroma signal on line 224 may comprise a signal in the form I * sin (wt) +Q * cos (wt), as generally required by the NTSC broadcast image format. At the frequency for computation of this signal which is employed in the present invention, it will be clear to one of ordinary skill in the art that this computation is simply made by multiplexing alternate values of the I and Q signals, as shown in the following table:

| | | | | |
|---|---|---|---|---|
| I * sin (wt) | +I, | 0, | −I, | 0 |
| Q * sin (wt) | 0, | −Q, | 0, | +Q |
| total chroma | +I, | −Q, | −I, | +Q |

The Y D/A 222 generates an analog Y signal on line 230; the I D/A 226 generates an analog I signal on line 232; and the Q D/A 228 may generate an analog Q signal on line 234. The analog Y signal on line 230 and the analog I signal on line 232 are summed at node 236 and the total filtered by a reconstruction filter 238 to produce a composite video signal on line 240, which is transmitted to output node 242. The analog Y signal on line 230, the analog I signal on line 232, and the analog Q signal on line 234 are transmitted to inputs 244 (Y), 246 (I), and 248 (Q) respectively of a summing matrix 250. The summing matrix 250 generates R, G, and B signals at outputs 252 (R), 254 (G), and 256 (B) respectively, which are then transmitted to output nodes 258, 260, and 262 respectively. The R, G, and B signals may be calculated as linear weighted sums of the Y, I, and Q signals, as is well known in the art.

When producing an NTSC signal for output (this is the normal mode of operation in a preferred embodiment) the Q D/A 228 is disabled and the I D/A 226 produces the complete chroma signal for NTSC output. Output from the Q D/A 228 is not required and is thus not included in the composite signal which is filtered by the reconstruction filter 238. When producing an RGB signal for output, both the I D/A 226 and the Q D/A 228 are active; the digital chroma modulator 216 is unnecessary and is thus disabled and propagates only I values.

While a presently preferred embodiment has been disclosed herein, many variations are possible which remain within the scope of the invention.

I claim:

1. A video image converter, including
    means for receiving a video image signal in a first image format, said first image format having at least one horizontal line and having a plurality of pixels of a predetermined horizontal resolution and a predetermined vertical resolution;
    means for subjecting a horizontal line of said video image signal in said first image format to anti-alias filtering to produce a smooth analog intermediate signal with limited bandwidth;
    means for converting said smooth analog intermediate signal to a second image format, said second image format having a predetermined horizontal resolution different from that of said first image format;
    means for associating at least one pixel in a primary horizontal line in said second image format with at least one pixel in at least one secondary horizontal line in said second image format; and
    means for computing a predetermined function of said associated pixels to produce a video image signal in a third image format, said third image format having a predetermined resolution in said vertical direction different form that of said first image format.

2. A video image converter as claimed in claim 1, wherein said predetermined function is weighted average.

3. A video image converter as claimed in claim 1, wherein at least part of substantially every said pixel in said first image format is incorporated into at least one pixel in said third image format, whereby no complete pixel of information is discarded.

4. A video image converter as claimed in claim 1, wherein said means for associating associates a pixel in a first horizontal line with a pixel in a second horizontal line and a pixel in a third horizontal line in said second image format.

5. A video image converter as claimed in claim 4, wherein said second horizontal line immediately precedes said first horizontal line.

6. A video image converter as claimed in claim 4, wherein said third horizontal line immediately follows said first horizontal line.

7. A method of converting video images, comprising the steps of receiving a video image signal in a first image format, said first image format having at least one horizontal line and having a plurality of pixels of a predetermined horizontal resolution and a predetermined vertical resolution;

subjecting a horizontal line of said video image signal in said first image format to anti-alias filtering to produce a smooth analog intermediate signal with limited bandwidth;

converting said smooth analog intermediate signal to a second image format, said second image format having a predetermined horizontal resolution different from that of said first image format;

associated at least one pixel in a primary horizontal line in said second image format with at least one pixel and at least one secondary horizontal line in said second image format; and computing a predetermined function of said associated pixels to produce a video image signal in a third image format, said third image format having a predetermined resolution in said vertical direction different from that of said first image format.

8. A method as in claim 7, wherein said step of associating associates a pixel in a first horizontal line with a pixel in a second horizontal line and a pixel in a third horizontal line in said second image format.

9. A method as in claim 7, wherein said second horizontal line immediately precedes said first horizontal line.

10. A method as in claim 7, wherein said third horizontal line immediately follows said first horizontal line.

11. A method as in claim 7, wherein said predetermined function is a weighted average.

12. A method as in claim 7, wherein at least part of substantially every said pixel in said first image format is incorporated into at least one pixel in said third image format, whereby no complete pixel of information is discarded.

13. A video image converter, comprising
means for receiving a video signal in a first image format comprising an RGB video image signal having at least one horizontal line and having a plurality of pixels of a predetermined horizontal resolution and predetermined vertical resolution;

means for transforming said RGB video image signal to Y, I, and Q components;

means for subjecting each of said Y, I, and Q components to anti-alias filtering to produce a smooth analog intermediate signal;

means for converting said smooth analog intermediate signal components to a second image format of digital form, said second image format having a predetermined horizontal resolution different from that of said first image format;

means for storing at least two complete horizontal scan lines of said second image format;

means for associating at least one pixel in a primary horizontal line of said second image format with at least one pixel in a secondary horizontal line in said second image format;

means for computing a predetermined function of said associated pixels to produce a video image signal in a third image format of digital form, said third image format having a predetermined resolution in a vertical direction different for that of said first image format by a predetermined amount; and means for recombining the signal in said third image format to produce a composite video image signal suitable for one of the group consisting of NTSC video transmission and RGB display.

14. A video image converter as in claim 13, wherein said means for receiving receives said RGB video image signal from a frame buffer memory.

15. A video image converter as in claim 13, wherein said means for transforming comprises a summing matrix.

16. A video image converter as in claim 13, wherein said means for converting comprises a digital-to-analog converter which samples said smooth analog intermediate signal at a predetermined frequency so as to produce a predetermined horizontal resolution in said second image format different from that of said first image format.

17. A video image converter as in claim 13, wherein said means for controlling comprises a sequential state machine which provides necessary control signals for said input line buffer.

18. A video image converter as in claim 13, wherein said predetermined function is a weighted average.

19. A video image converter as in claim 13, wherein a predetermined portion of each and every pixel in said first image format is incorporated into at least one pixel in said third image format such that no complete pixel of information is discarded.

20. A video image converter as in claim 13, wherein said means for reconstruction comprises summing matrix means for converting said signal said third image format to RGB format.

21. A video image converter as in claim 13, wherein said means for subjecting comprises anti-aliasing filters and summing op-amps which respectively smooth and combine said Y, I and Q signal components to create said smooth analog intermediate signal.

22. A video image converter as in claim 21, wherein said summing op-amps, under the control of said means for timing, also mute the transmission of said Y, I and Q components of said smooth analog intermediate signal so as to allow only one component to pass to said means for converting in any given interval.

23. A video image converter as in claim 13, wherein said means for storing comprises an input line buffer.

24. A video image converter as in claim 23, wherein each set of values of Y, I, and Q are read into said input line buffer horizontally and read out of said input line buffer diagonally.

25. A video image converter as in claim 13, wherein said means for associating associates a pixel in a first pixel in a third horizontal line all in said second image format.

26. A video image converter as in claim 25, wherein said second horizontal line immediately precedes said first horizontal line.

27. A video image converter as in claim 25, wherein said third horizontal line immediately follows said first horizontal line.

28. A video image converter as in claim 13, wherein said means for recombining comprises digital-to-analog converter means, at least one summing op-amp, and at least one reconstruction filter.

29. A video image converter as in claim 28, wherein said digital-to-analog converter means convert said weighted average signal to analog format.

30. A video image converter as in claim 28, wherein said op-amp recombines said analog Y, I, and Q components to provide a composite analog video signal.

31. A video image converter as in claim 28, wherein said reconstruction filter limits the bandwidth of said composite analog video signal to produce a video signal that is suitable for standard NTSC transmission.

32. A video image converter as in claim 13, wherein said means for computing comprises multipliers which receive weighted coefficients from a microprocessor.

33. A video image converter as in claim 32, wherein the outputs of said multipliers are summed in a feedback adder configuration to produce a weighted average signal of said third image format.

34. A video image converter as in claim 33, wherein said feedback is provided by frame buffers that stored a plurality of horizontal lines of image pixels.

35. A video image converter as in claim 33, wherein said averaged signal comprises an average of multiple horizontal lines of image pixels.

36. A video image converter as in claim 33, wherein said weighted average alters the vertical resolution such that the vertical resolution of said third image format differs from the vertical resolution of said first and said second image formats.

* * * * *